April 18, 1950 — A. P. FALL — 2,504,671
CONSTRUCTION OF PISTON RINGS
Filed Jan. 3, 1947
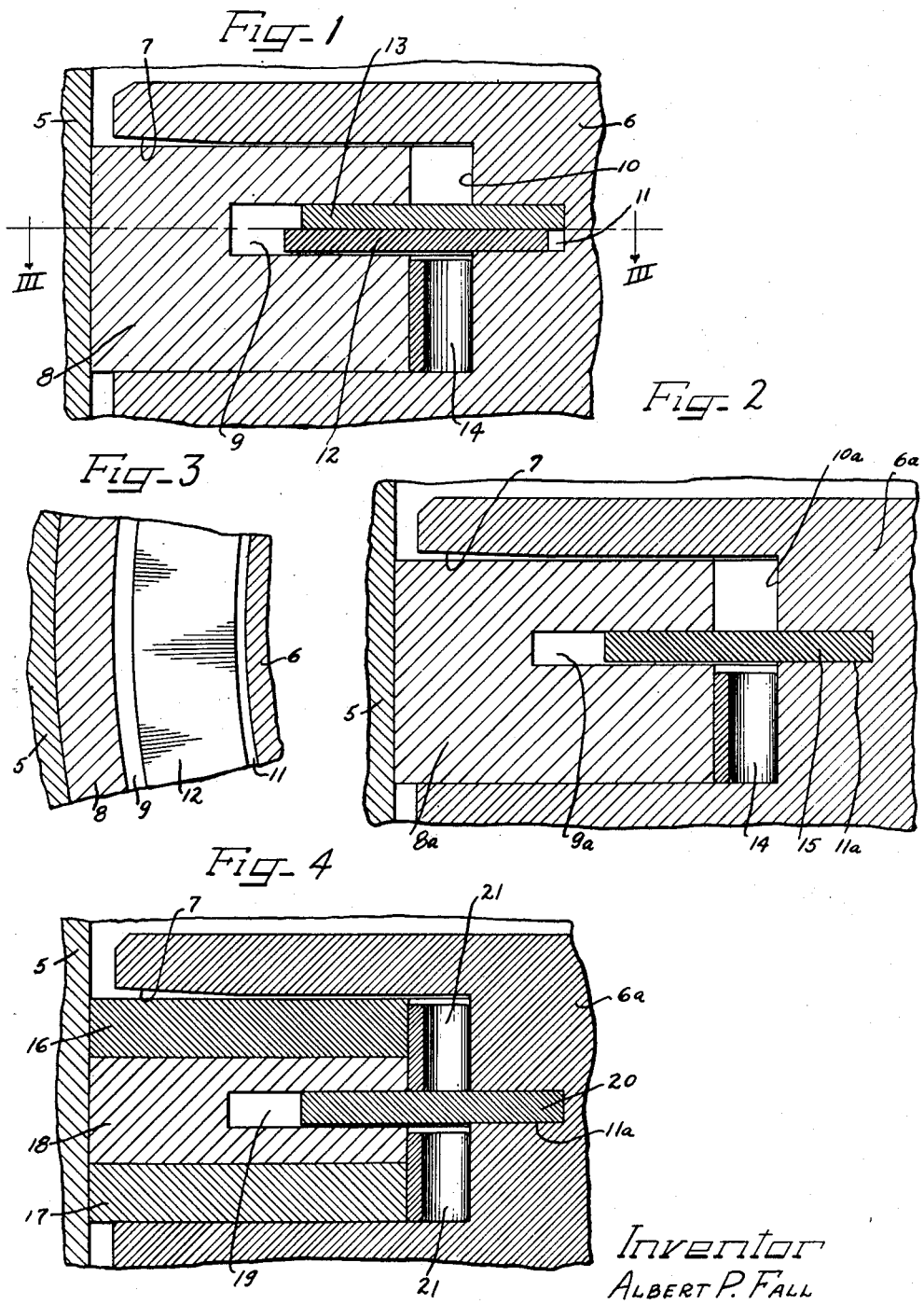
Inventor
ALBERT P. FALL
by The Firm of Charles w Hills Attys Patented Apr. 18, 1950

2,504,671

UNITED STATES PATENT OFFICE 2,504,671

CONSTRUCTION OF PISTON RINGS

Albert P. Fall, Toledo, Ohio

Application January 3, 1947, Serial No. 720,024

2 Claims. (Cl. 309—44)

The present invention relates to a construction of piston and ring, and more particularly to a method of and means for preventing gas losses in internal combustion engines and the like.

The present invention has to do with ways and means for preventing "blow-by" or "power loss" experienced in internal combustion engines, Diesel engines, and air compressors, as at the present time constructed. The problem is to prevent the products of combustion from traveling by the rear of a piston ring, from the combustion chamber end of a piston to the crankcase end, so as to prevent power losses.

While the present invention will be illustrated and described with respect to piston ring construction for an internal combustion engine, it is to be understood that the same principle may be applied to rings used in Diesel engines, in pistons for air compressors, and other similar structures.

An important object of the present invention is to provide a piston and ring construction to prevent "blow-by" past the rears of the piston rings.

Another object of the present invention is to prevent "blow-by" past the rears of the piston rings.

Another object of the present invention is to prevent "blow-by" in internal combustion and like engines, which includes the provision of a bridge between a ring section and piston which ring is entered in registering grooves in a piston ring section and piston to provide surface engagement between a wall of the ring section and a face of the bridge, as the piston is reciprocated, to effectively seal gas passageway back of the ring section.

A further object of the present invention is to provide means for preventing "blow-by" in internal combustion engines, and the like, which includes utilizing a shoe ring entered in registering grooves in the piston ring section and the piston to bridge the space between the section and piston to effect a surface seal whenever the piston is reciprocated.

The above, other and further objects of the present invention will be apparent from the following description and accompanying drawings.

An embodiment of the present invention is illustrated in the accompanying drawing, and the views thereof are as follows:

Figure 1 is a fragmental axial sectional view through the upper end of a piston showing a single ring section in the piston ring groove and a bridge between the ring section and piston comprising two thin flat shoe rings inserted in the grooves to bridge the space between the ring section and the piston, with the passageway sealed on upstroke.

Figure 2 is a view similar to Figure 1 showing a single shoe ring.

Figure 3 is a fragmental cross-sectional view taken on the plane of line III—III of Figure 1, and Figure 4 is a fragmental axial sectional view through the upper end of a piston showing one manner of applying the present invention to a piston ring of three pieces.

Referring to Figure 1, 5 designates a portion of a cylinder wall. 6 is a portion of the upper end of a piston having a piston ring groove 7 in it.

A piston ring section 8 is installed in the groove 7 with its outer margin against the surface of the cylinder 5 in the usual manner. The concave periphery of the ring section is provided with a groove 9.

The bottom 10 of the piston ring groove 7 in the piston is formed with a groove 11 extending inwardly from the bottom of the ring groove 7 in a direction at right angles to the axis of the piston.

Entered in the grooves 9 and 11, which of course are in register, are contracting shoe rings 12 and 13. Each ring is made of high carbon steel and very springy and preferably is a one-piece split ring. The rings 12 and 13 are applied in the groove 11 of the piston by spreading the split ends of the rings and inserting them over the piston and into the groove 11. The inherent resiliency of the shoe rings is such as to cause them to contract when within the groove 11 and resume their substantially circular shape. The radial width of the rings 12 and 13 is such that each ring will span the space between the piston ring section 8 and the bottom 10 of the piston ring groove 7 and be entered in the grooves 9 and 11, as illustrated.

It will be observed that as the piston is reciprocated in the cylinder, on down stroke, for example, the upper surface of the piston ring groove 7 will engage the upper surface of the ring section 8 while the surface of the lower wall of the section groove 9 will engage the lower surface of the lower shoe ring section 12, thus effectively sealing the gas passageway from the combustion chamber of the cylinder back of the ring section 8.

On down strokes, the upper surface of the groove 11 in the piston will engage the upper surface of the shoe ring 13 in sealing relation.

It will be thus observed that the passageway between the ring section 8 and the piston ring groove is effectively sealed against gas passageway thus preventing "blow-by."

In order to maintain the outer surface of the ring section 8 in tight contact with the cylinder wall expansion means such as an expander 14, may be interposed between the bottom 10 of the piston ring groove 7 and the adjacent surface of the ring section 8.

On up strokes, the lower margin of the piston ring groove 7 will make surface engagement with the lower face of the ring section 8 and at the same time the lower margin of the ring groove 9 will make surface engagement with the lower surface of the lower shoe ring 12. Also, the lower margin of the groove 11 in the piston will make surface engagement with the lower shoe ring 12, thus sealing passageway between the ring section 8 and the piston.

Referring to Figure 2, the construction is the same as described with reference to Figure 1 except that the two shoe rings 12 and 13 are replaced by a single shoe ring 15, the action of which with respect to the ring section and the piston is the same, for effectively sealing gas passageway between the ring section and the piston.

While the present invention has been illustrated as applied to a single piston ring section, it is to be understood that the single ring section 8 might be replaced with a ring of several sections, in which event one of the sections would be provided with a groove corresponding to the groove 9, to receive the bridge ring to seal the space between the ring section and the piston.

Where the piston ring comprises two or more sections, then for obvious reasons it would be preferable to employ but a single shoe ring to seal the passageway between the ring section and piston to function in the manner heretofore described.

Referring to Figure 2 the ring section 8a has a groove 9a in its concave periphery. The piston 6a has a groove 11a in register with the ring section groove 9a. A spring shoe ring 15 is applied in the piston groove 11a and then the ring section 8a is installed in the ring groove 7 with the section groove 9a receiving the shoe ring 15, the expander 14 having been installed.

Figure 4 shows a three piece piston ring comprising outer pieces 16 and 17 with a mid piece 18, the latter being of greater axial dimension than pieces 16 and 17. The mid piece 18 has a groove 19 throughout its concave periphery. The piston 6a has a piston ring groove 7 with a groove 11a inwardly from its bottom. A spring shoe ring 20 is in the grooves 11a and 19. While not essential, two expanders 21 are installed between the bottom of the piston ring groove 7 and the piston ring pieces 16, 18, 17 to maintain surface contact between the piston ring and cylinder wall.

The arrangements shown in Figures 2 and 4 function to prevent "blowby" back of the piston rings 8a and the pieces 16, 18 and 17 in the manner described with reference to Figure 1.

Figure 3 shows the relationship of the shoe ring 12 with reference to the grooves 9 and 11. As before stated, the shoe ring might hug the bottom of the groove 11.

The shoe rings may be said to function with cantilever action.

It is known that compression rings must have side clearance and be free in the ring grooves, otherwise they would not seal the explosion pressure to be utilized as power. Hence, on piston reciprocation the walls of the groove in the ring section will alternately make surface sealing contact with the faces of the shoe ring or bridge, thereby sealing the space between the ring section and piston ring groove against "blowby" and gas passage. The shoe rings fit the grooves in the piston and ring section with usual manufacturing tolerances.

The present invention lends itself readily to compression rings and oil rings.

The method of the present invention contemplates the provision of forming a bridge between the ring section and piston to close the space therebetween for preventing "blow-by" or "power loss."

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In combination a piston having a piston ring groove and an auxiliary annular groove extending inwardly from the bottom of the ring groove, a ring in said piston ring groove having a circumferential groove on its inner concave periphery in registry with the auxiliary groove in said piston, a ring expander in said piston ring groove between the bottom of said groove and said piston ring for urging said piston ring outwardly and a contracting shoe ring disposed in said registering groove to bridge the gap between the bottom of the piston ring groove and the inner periphery of the piston ring portion of said shoe ring that is in said registering groove being disposed close against the walls of said groove and the portion of said shoe ring that is in said ring groove being loosely disposed therein whereby the shoe ring has a cantilever action with the wall portions in the ring groove alternately making sealing contact with the opposite walls of that groove.

2. In combination a piston having a piston ring groove and an auxiliary annular groove extending inwardly from the bottom of the ring groove, a ring in said piston ring groove having a circumferential groove on its inner concave periphery in registry with the auxiliary groove in said piston, a ring expander in said piston ring groove engaging the bottom of said groove below said auxiliary groove and engaging the piston ring below said circumferential groove and a contracting shoe ring disposed in said registering groove above said ring expander and in the piston ring groove to bridge the gap between the base of the piston groove and the inner wall of the piston ring affording a heat shield for said expander.

ALBERT P. FALL.

REFERENCES CITED

The following references are of record in the file of this patent:

UNITED STATES PATENTS

| Number | Name | Date |
| --- | --- | --- |
| 1,207,198 | Mummert | Dec. 5, 1916 |
| 2,228,495 | Williams | Jan. 14, 1941 |